United States Patent [19]
Cron, Jr.

[11] 3,744,177
[45] July 10, 1973

[54] DETACHABLE CONNECTOR AND FISHING MEANS COMBINATION

[76] Inventor: Oliver M. Cron, Jr., 6103 Vista Knolls, Paradise, Calif. 95969

[22] Filed: Oct. 6, 1971

[21] Appl. No.: 186,938

[52] U.S. Cl. .............................................. 43/43.12
[51] Int. Cl. ...................... A01k 91/02, A01k 95/00
[58] Field of Search ...................... 43/43.12, 42.72, 43/43.14, 44.89, 44.93, 44.97, 44.81; 24/123 R

[56] References Cited
UNITED STATES PATENTS

| | | | |
|---|---|---|---|
| 3,210,883 | 10/1965 | Ulsh | 43/43.12 |
| 3,091,885 | 6/1963 | Ulsh | 43/43.12 X |
| 3,405,476 | 10/1968 | Pumilio | 43/43.12 |
| 3,659,370 | 5/1972 | Ritter | 43/43.12 |
| 3,648,398 | 3/1972 | Newell | 43/43.12 |
| 3,518,784 | 7/1970 | Kling et al. | 43/43.12 |

FOREIGN PATENTS OR APPLICATIONS

| | | | |
|---|---|---|---|
| 587,043 | 11/1959 | Canada | 43/43.12 |

Primary Examiner—Louis G. Mancene
Assistant Examiner—James H. Czerwonky
Attorney—Ernest L. Brown

[57] ABSTRACT

A fishing means and connector combination particularly adapted to attach fishing lines, nets, bobbers, sinkers, and the like, wherein a resilient member has a calibrated breakaway pull.

The fishing means has a cylindrical stud projecting therefrom on which an annular, resilient collar is normally loosely mounted. The collar has an interior dimension greater than that of the diameter of the stud, and has a length less than that of the stud. The collar, in its unstretched state, is retained on the stud by a spherical knob at the end of the stud and by the fishing means. The collar, when stretched, passes over the knob to release the fishing means.

5 Claims, 9 Drawing Figures

PATENTED JUL 10 1973  3,744,177
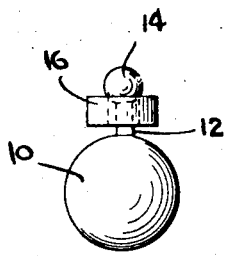
Fig. 1
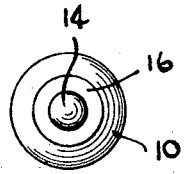
Fig. 2
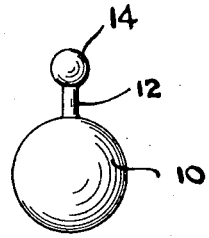
Fig. 3
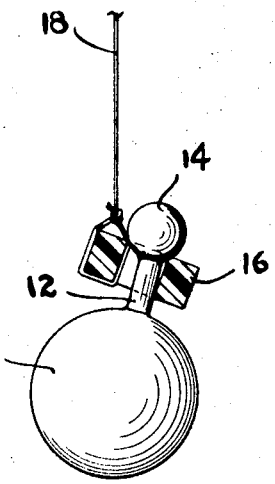
Fig. 5
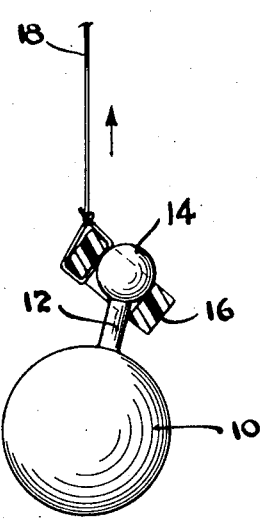
Fig. 6
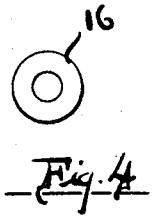
Fig. 4
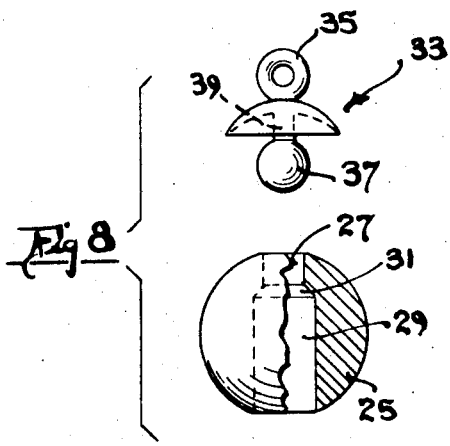
Fig. 8
Fig. 9
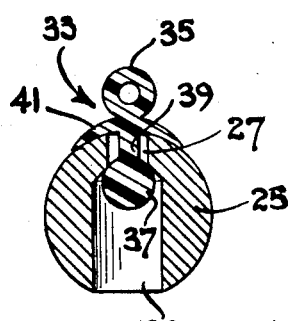
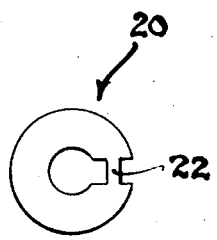
Fig. 7
INVENTOR.
OLIVER M. CRON, Jr.

DETACHABLE CONNECTOR AND FISHING MEANS COMBINATION

BACKGROUND OF THE INVENTION

The patent literature teaches a number of breakaway structures which are adapted for the same use, but are different than the structure of this invention.

U.S. Pat. No. 3,180,052 teaches a central male member made of flexible material with a bifurcated end portion having two prongs which are compressed toward each other to allow a weight to break free.

U.S. Pat. No. 3,180,051 teaches the use of magnetic sinkers which are held together, clamping a fishing line, by magnets. When a pull is sufficiently strong to overcome the magnetic pull, the sinkers fall away from the line.

U.S. Pat. No. 3,195,262 shows another breakaway sinker wherein a flexible bail is used, positioned in a beveled opening in the sinker, whereby when the bail is flexed by pulling it, the sinker is disengaged.

U.S. Pat. Nos. 3,408,701 and 3,280,498 teach breakaway sinkers wherein the attachments use flexible slits therein which are stretched to place the fishing line or sinker in their respective holes. Excessive tension between the sinker and line causes either the sinker or line to pull free of the slitted attacher.

U.S. Pat. No. 2,768,468 teaches a spring release clip wherein a collar is slit, and the two remaining parts are biased together into abutment, whereby tension on a line passing through the collar eventually forces the two jaws of the collar apart, disengaging the line.

U.S. Pat. No. 2,326,876 teaches a resilient member within a sinker for releasing the attaching stud.

BRIEF DESCRIPTION OF THE INVENTION

The first embodiment of the breakaway connector of this invention, particularly adapted to break away from a fishing sinker, comprises a stud or stem with an enlarged end portion. The stud may conveniently be part of a fishing sinker. A calibrated resilient collar, preferably of plastic material, fits over the stem or stud with an interference fit on the enlarged end portion. The collar may then be attached to a fishing line. When the collar is pulled relative to the item to which it is attached, the collar tilts, stretching it over the enlarged end portion.

A second embodiment is similar to the first embodiment except that the collar does not release readily. To release the collar from the sinker, the collar must be broken. To that end it has a calibrated weakened portion at one part of its periphery.

A third embodiment of this ivnention uses a resilient stud, which may be, for example, made of nylon or other resilient material, adapted to be attached to a fishing line. A hole is bored or formed through the member to which it is attached, which may conveniently be a fishing sinker. The hole is countersunk from one side to produce a chamber into which the stud extends. An enlarged portion of the stud forms an interference fit with the smaller bore but not with the larger bore. The stud preferably has a stop on it to prevent the line from pulling through the hole.

Collars and studs may be color coded for various pulling breakaway strengths.

It is therefore an object of this invention to provide a breakaway device.

It is a more particular object of this invention to provide such a breakaway device which is particularly adapted for use with fishing sinkers.

It is a specific object of this invention to provide a novel breakaway sinker.

BRIEF DESCRIPTION OF THE DRAWINGS

Other objects will become apparent from the following description, taken in connection with the accompanying drawings.

FIG. 1 is a side view of a first embodiment of the invention.

FIG. 2 is a top view of the embodiment of FIG. 1.

FIG. 3 is a side view of the weighted member of the embodiment of FIG. 1.

FIG. 4 is a view of the resilient ring of FIG. 1.

FIG. 5 is a view of the embodiment of FIG. 1, showing the resilient ring in cross section, with a line attached to the ring and the ring in its relatively unstretched position.

FIG. 6 is a view of the embodiment of FIG. 1, showing the resilient ring in cross section, with a line attached to the ring and the ring being stretched to break away from the weighted member.

FIG. 7 is a view of an alterntive embodiment of the ring of FIG. 4 showing a weakened portion of the ring which is adapted to break away to release the ring from a stud.

FIG. 8 shows the two parts of a third embodiment of the invention wherein a resilient stud is adapted to be inserted into an opening in a weighted member.

FIG. 9 shows the embodiment of FIG. 8 in assembled form.

DETAILED DESCRIPTION OF THE INVENTION

In FIGS. 1–6, a weight element 10, usually spherical, has a stud 12 extending outward therefrom. On the outer end of the stud 12 is a small knob 14. Although the length can be varied, in a preferred embodiment the length of the shank 12 of the stud is substantially equal to the diameter of the knob 14.

In a preferred embodiment, the collar 16 is a segment of a piece of tubing. Typical materials which may be used for the collar 16 are:

polyethylene, vinyl, fiberglass, neoprene, rubber, teflon, polyurethane, and polystyrene.

The shank 12 and knob 14 may be standardized. For example, with a 5/32 inch shank length and a 5/32 inch diameter of the knob 14, and using a collar 16 fabricated of vinyl, having an outside diameter of ¼ inch, a collar with an inside diameter of 0.125 inch requires a two pound pull for breakaway. A collar with an inside diameter of 0.112 inch requires a 4 pound pull for breakaway.

A line 18, such as a fishing line, is attached to the sinker collar 16. A pull on the collar 16 causes the collar to tip as shown in FIG. 5. Further pulling of the line causes the collar to be stretched over the knob 14 as the collar 16 is tilted (See FIG. 6).

With a standardized shank 12 and knob 14, the collars 16 may be color coded to reflect the amount of pull needed to dislodge the collars.

An alternate embodiment of the collar is shown at 20 in FIG. 7. The collar 20 has a portion 22 of decreased size which is adapted to be broken when a calibrated pull is given to the collar. The collar 20 is not adapted, particularly, to stretch over the knob 14 as the collar 16. The collar 20 would preferably be forced onto the shank 12 and broken away by breaking the weakened section 22. The collar could, for example, be placed on the shank 12 during manufacture.

A third embodiment of the breakaway sinker of this invention is shown in FIGS. 8 and 9. A weighted sinker 25 has a hole 27 formed therethrough. The hole 27 is enlarged in a portion 29, as by counter boring with a larger drill. The counter bore 29 may be tapered at the transition section 31 between the hole 27 and the hole 29. Preferably the holes 27 and 29 are substantially coaxial.

A resilient stud 33 has an attaching ring 35 on one end for attaching to a line. A resilient knob 37 is formed on the other end of the shank 39. The diameter of the knob 37 is slightly larger than the diameter of the hole 27. The diameter of the shank 39 is less than the diameter of the hole 27. The size of the knob 37 and the material of the knob 37, as well as the size of the hole 27 determines the amount of pull needed to break away the sinker 25 from the stud 33. A stop or guard 41 is preferably, but not necessarily, formed on the stud 33 to prevent the stud 33 from penetrating more than desired into the hole 29.

It is apparent, therefore, that the breakaway sinker of this invention fills an economic need in being mass producible, whereby such sinkers may be made available at a reasonable price.

Although the invention has been described in detail above, it is not intended that the invention shall be limited by that description, but only in accordance with that description taken together with the appended claims.

I claim:

1. A detachable fishing means and connector combination for connecting said means to a line comprising: a cylindrical stud projecting from said means, said stud having a spherical knob on the end thereof, said means having a transverse dimension greater than that of said knob; and a resilient annular collar loosely mounted on said stud between said knob and said means, wherein the inside dimension of said collar, in an unstretched state, is greater than the diameter of said cylindrical stud and less than the diameter of said spherical knob and wherein the length of said collar is less than the length of said stud.

2. A combination as recited in claim 1 in which said collar has a thickness and said length sufficient to produce a calibrated pull when said collar is stretched and tilted over said knob.

3. A combination as recited in claim 2 in which said collar is color coded to represent the amount of pull needed to detach said collar from said fishing means.

4. A combination as recited in claim 2 and further comprising a line attached to one side of said collar, so that a pull on said line and said combination stretches said collar and tilts it over said knob.

5. A combination as recited in claim 4 in which said means is a spherical sinker.

* * * * *